(12) United States Patent
Meinzer et al.

(10) Patent No.: US 9,919,644 B2
(45) Date of Patent: Mar. 20, 2018

(54) MOTOR VEHICLE

(71) Applicant: Bayerische Motoren Werke Aktiengesellschaft, Munich (DE)

(72) Inventors: Patric Meinzer, Munich (DE); Wolfgang Wirtz, Munich (DE); Max Klimke, Munich (DE); Marcel Sieler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 54 days.

(21) Appl. No.: 14/939,404

(22) Filed: Nov. 12, 2015

(65) Prior Publication Data

US 2016/0059771 A1 Mar. 3, 2016

Related U.S. Application Data

(63) Continuation of application No. PCT/EP2014/059626, filed on May 12, 2014.

(30) Foreign Application Priority Data

Jun. 24, 2013 (DE) .................. 10 2013 211 877

(51) Int. Cl.
*B60Q 1/24* (2006.01)
*B60Q 1/26* (2006.01)
(Continued)

(52) U.S. Cl.
CPC ............. *B60Q 1/24* (2013.01); *B60Q 1/0023* (2013.01); *B60Q 1/0076* (2013.01);
(Continued)

(58) Field of Classification Search
CPC ....... B60R 1/12; B60R 1/1207; B60Q 1/2665; B60Q 2400/20; F21S 48/215
See application file for complete search history.

(56) References Cited

U.S. PATENT DOCUMENTS 5,497,306 A 3/1996 Pastrick
5,499,306 A 3/1996 Sasaki et al.
(Continued)

FOREIGN PATENT DOCUMENTS

CN 102774314 A 11/2012
DE 198 05 771 A1 8/1999
(Continued)

OTHER PUBLICATIONS

International Search Report (PCT/ISA/210) issued in PCT Application No. PCT/EP2014/059626 dated Aug. 11, 2014 with English translation (nine pages).

(Continued)

*Primary Examiner* — Elmito Breval
(74) *Attorney, Agent, or Firm* — Crowell & Moring LLP

(57) ABSTRACT

A motor vehicle has a surroundings-illuminating device for producing a light distribution on the ground surrounding the motor vehicle. The surroundings-illuminating device includes one or more projection modules for producing the light distribution, wherein every projection module has at least one light source and an array of projection optical systems which from the light of the at least one light source generates at least a part of the light distribution.

19 Claims, 2 Drawing Sheets

(51) Int. Cl.
*B60Q 1/32* (2006.01)
*B60Q 1/00* (2006.01)

(52) U.S. Cl.
CPC .......... *B60Q 1/2696* (2013.01); *B60Q 1/32* (2013.01); *B60Q 1/323* (2013.01); *B60Q 2400/40* (2013.01)

(56) References Cited

U.S. PATENT DOCUMENTS

| | | | |
|---|---|---|---|
| 6,152,590 A * | 11/2000 | Furst | B60Q 1/2665 362/249.02 |
| 8,777,424 B2 | 7/2014 | Schreiber et al. | |
| 2002/0041498 A1 | 4/2002 | Furst et al. | |
| 2012/0089299 A1 | 4/2012 | Breed | |
| 2012/0280528 A1 | 11/2012 | Dellock et al. | |
| 2014/0146290 A1 | 5/2014 | Sieler et al. | |

FOREIGN PATENT DOCUMENTS

| | | |
|---|---|---|
| DE | 199 36 357 A1 | 2/2001 |
| DE | 20 2005 017 408 U1 | 1/2006 |
| DE | 10 2007 050 830 A1 | 4/2009 |
| DE | 20 2008 016 695 U1 | 4/2009 |
| DE | 10 2009 024 894 A1 | 12/2010 |
| DE | 10 2011 076 083 A1 | 11/2012 |
| EP | 2 674 328 A2 | 12/2013 |
| TW | 201109731 A1 | 3/2011 |
| WO | WO 2005/035308 A1 | 4/2005 |

OTHER PUBLICATIONS

German Search Report issued in corresponding German Application No. 10 2013 211 877.5 dated Feb. 3, 2014 with partial English translation (10 pages).
Chinese Office Action issued in counterpart Chinese Application No. 201480027532.2 dated Sep. 18, 2016 with English translation (21 pages).

* cited by examiner

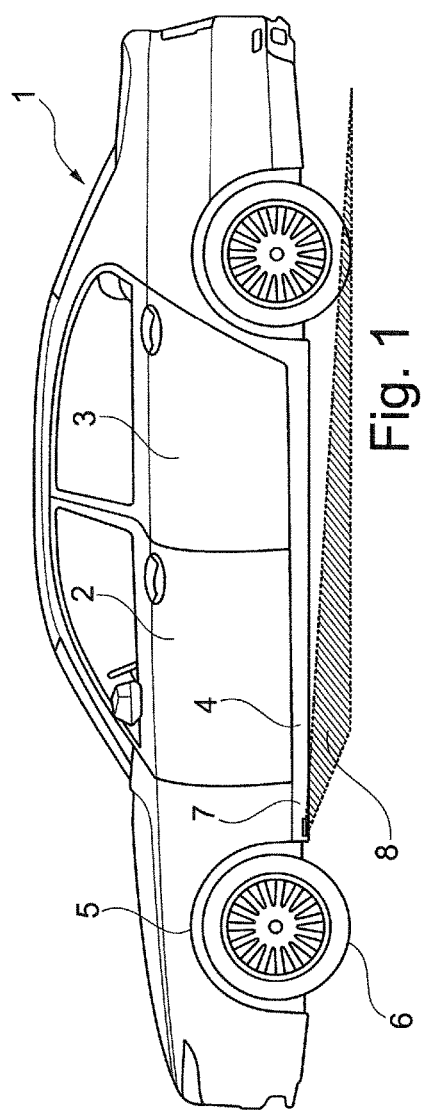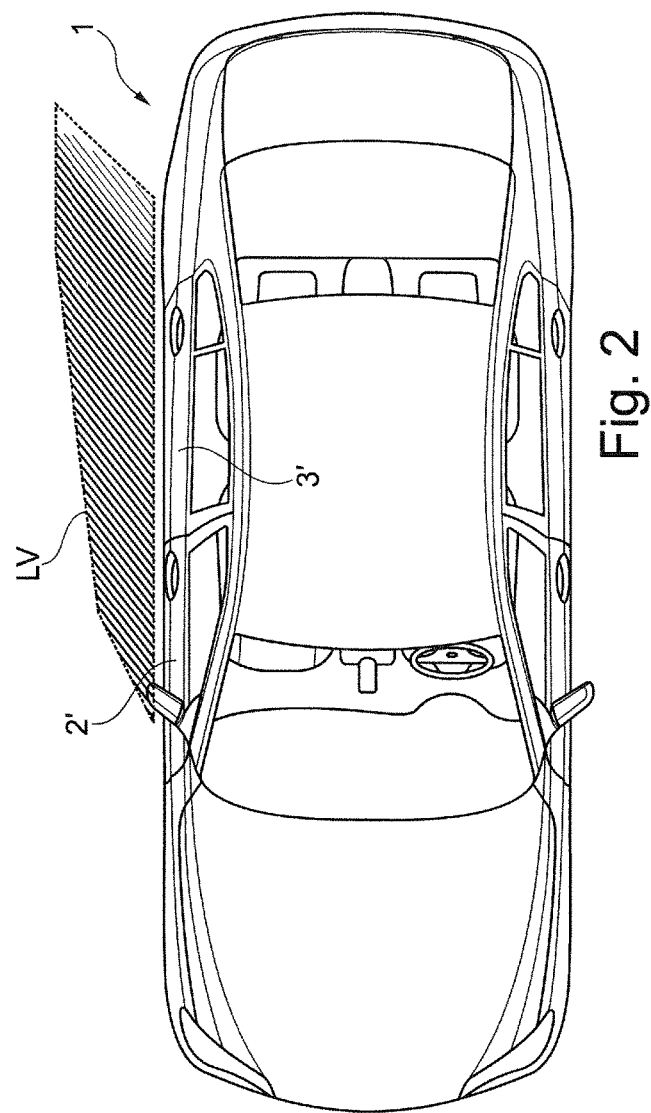

MOTOR VEHICLE

CROSS REFERENCE TO RELATED APPLICATIONS

This application is a continuation of PCT International Application No. PCT/EP2014/059626, filed May 12, 2014, which claims priority under 35 U.S.C. § 119 from German Patent Application No. 10 2013 211 877.5, filed Jun. 24, 2013, the entire disclosures of which are herein expressly incorporated by reference.

BACKGROUND AND SUMMARY OF THE INVENTION

The invention relates to a motor vehicle having a surroundings-illuminating device for producing a light distribution on the ground surrounding the motor vehicle.

Surroundings-illuminating devices known in the prior art can generate a light distribution and, in particular, a light pattern in the surroundings around a motor vehicle. Such a surroundings-illuminating device is disclosed in the publication DE 10 2007 050 830A1, for example. Traditional surroundings-illuminating devices have the disadvantage that they usually require a large installation space in the vehicle.

It is also known that a surroundings-illuminating device which is activated when the vehicle is unlocked may be integrated into the exterior door handle on a motor vehicle. Likewise, there are exit courtesy lights, which are built into the lower edge of the door panel of a motor vehicle. Surroundings lights in the exterior door handle and exit courtesy lights have the disadvantage that they are visible only when the door is closed or opened.

The object of the invention is to create a motor vehicle having a surroundings-illuminating device, which requires little installation space and generates a readily discernible light distribution on the ground in the surroundings around the motor vehicle.

This and other objects are achieved by a motor vehicle according to the invention, which is a passenger vehicle in particular, comprising a surroundings-illuminating device for generating a light distribution on the ground in the surroundings around the motor vehicle. To generate this light distribution, the surroundings-illuminating device has one or more projection modules, wherein a respective projection module comprises at least one light source and an array of projection lenses. This array generates at least a portion of the light distribution from the light of the at least one light source. If the surroundings-illuminating device comprises only one projection module, this module is responsible for generating the total light distribution. The motor vehicle according to the invention may, optionally, also have a plurality of surroundings-illuminating devices having corresponding projection modules. In this case, each surroundings-illuminating device will generate a separate light distribution.

The invention has the advantage that a sharp light distribution can be generated easily by use of a projection module with the help of an array of projection optical systems. The projection module is very compact. The projection modules used in the motor vehicle according to the invention preferably have dimensions in the centimeter range and/or several millimeters. Each projection optical system in the array of projection optical systems preferably includes at least one micro lens, which has a diameter of 2000 µm or less in particular. Furthermore, an array preferably includes between 100 and 400 projection optical systems, in particular about 200 projection optical systems.

In a particularly preferred embodiment, a projection display, as described in the document DE 10 2009 024 894 A1 (having U.S. counterpart U.S. Pat. No. 8,777,424 B2) and/or in the document DE 10 2011 076 083 A1 (having U.S. counterpart US 2014/0146290 A1), is used as the projection module. The contents of these published documents are hereby incorporated by reference herein. One or more LEDs and/or, optionally, one or more laser diodes are preferably used as the light source in the projection module.

In another preferred embodiment, a respective projection module is designed so that each projection optical system of the array of projection optical system projects a single image onto the ground covering essentially the total light distribution, wherein the light distribution is superimposed individual images of the projection optical systems. Generation of the light distribution (with a reduced light brightness) is ensured in this way even when the light emission from the projection module is partially contaminated. Therefore, the light distribution is not obscured or cut off in certain regions.

In a particularly preferred embodiment, the projection module(s) is/are arranged in a light shaft extending into the body of the motor vehicle, thereby preventing direct glare due to the light source.

In another embodiment, the installation position of the projection module(s) in the motor vehicle can be adjusted. In other words, corresponding adjustment mechanisms are provided. These adjustment mechanisms can permit manual and/or automatic adjustment of the installation position, depending on the application case. In this way, manufacturing tolerances can be taken into account in the integration of the projection module into the vehicle and the corresponding light distribution can always be imaged sharply by adjustment of the installation position of the projection modules.

In another particularly preferred embodiment, the light distribution has a light pattern, i.e., a structured brightness distribution, which may optionally also be embodied in color. In one variant, the light pattern includes a pattern of stripes. The density of the stripes then preferably decreases in a predetermined direction on the ground with an increase in the distance of the striped pattern from the installation position of the projection module(s). Corresponding effects can be generated with the light distribution in this way.

In another embodiment, the light pattern includes a pattern of dots and/or graphic elements such as logos. The density of the dots and/or graphic elements then preferably decreases in a predetermined direction on the ground with an increase in the distance of the pattern from the installation position of the projection module(s) in the motor vehicle. On the other hand, the diameter of the dots and/or of the graphic elements increases in a predetermined direction on the ground with an increase in the distance of the pattern from the installation position of the projection modules.

In a particularly preferred embodiment, the dots of the dot pattern next to the installation position of the projection module(s) may at first have a diameter of 3 mm, wherein this diameter then increases continuously to 40 mm. Likewise, the dot spacing may at first be only in the range of approximately 4 to 5 mm and then increases continuously to 40 mm with a greater distance from the installation position.

In another embodiment, the projected light distribution becomes wider along a predetermined direction on the ground with an increase in the distance of the light distribution from the installation position of the projection module(s) in the motor vehicle.

The activation of the light distribution (i.e., the activation of the light source(s) of the projection module(s)) can be linked to various events. The light distribution is preferably generated when a central lock in the motor vehicle is unlocked and/or an access door in the motor vehicle is opened. The activation of the light distribution may optionally also take place by dimming-up (i.e., continuously increasing the brightness) of the at least one light effect of the projection module(s), so that attractive light sources can be generated.

In a particularly preferred embodiment of the motor vehicle according to the invention, the projection module(s) is/are mounted in the region of an access door of the motor vehicle such that the light distribution is generated in the opening area of the access door, wherein the light distribution is preferably not shaded by opening the access door. The access door is preferably a passenger entry door. In this way, light scenes are generated when the vehicle is being unlocked and/or when people are entering or exiting the vehicle. Furthermore, safety is increased by the good illumination of the ground before the passengers enter.

In another embodiment, the projection module(s) is/are provided in a door sill of the motor vehicle, in particular at an installation position which is situated in front of a passenger entry door as seen in the longitudinal direction of the motor vehicle from the front end to the rear end. The light distribution is generated in particular next to this passenger entry door in that the projection module(s) project(s) the light in the direction toward the rear next to the passenger entry door.

In another particularly preferred embodiment, the projection module(s) generate a light distribution during operation, this distribution extending on one side of the motor vehicle essentially along a driver's or passenger's entry door and an entry door situated behind it for passengers in the rear. Surroundings-illuminating devices are preferably provided with corresponding projection modules on both sides of the motor vehicle.

Alternatively or additionally, there is the possibility that a surroundings-illuminating device is installed in the motor vehicle, its projection modules generating during operation a light distribution beneath and/or in the longitudinal direction of the motor vehicle behind a luggage compartment access door. The concept of a luggage compartment access door is to be understood broadly here and may also include the luggage compartment access door of a vehicle having a hatch, a hatchback and/or fastback, in addition to the luggage compartment access door of a notchback sedan.

In another variant of the motor vehicle according to the invention, the light distribution on the ground indicates the detection field of a wireless sensor, wherein the detection field is preferably an operating field, so that when body parts and/or objects enter the operating field, an operating action is automatically triggered in the motor vehicle. In a preferred variant, the wireless sensor is designed so that, on detection of a foot in the detection field, the luggage compartment access door is automatically unlocked and/or opened.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a side view of a motor vehicle according to an embodiment of the invention having a surroundings-illuminating device;

FIG. 2 is a top view of the motor vehicle from FIG. 1;

DETAILED DESCRIPTION OF THE DRAWINGS

Figure 3:
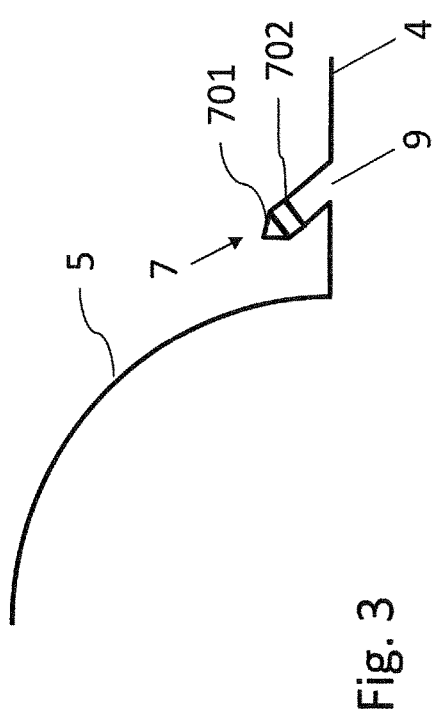
FIG. 3 is a schematic detailed view of the surroundings-illuminating device shown in FIG. 1.

An embodiment of a motor vehicle according to the invention having a surroundings-illuminating device is described below. This device is integrated into the door sill of the motor vehicle and serves to provide lateral illumination of the region next to the passenger entry doors of the motor vehicle.

FIG. 1 shows a side view of the motor vehicle in the form of passenger vehicle 1. On the left side shown in the figure, the passenger vehicle includes a driver's door 2 and a rear door 3. Similarly, a passenger door 2' and a rear door 3' situated behind that are provided on the opposite side of the vehicle (FIG. 2). In the exemplary embodiment shown in FIG. 1, a surroundings-illuminating device 7 is provided in the door sill 4 beneath the doors 2 and 3. This illumination device is situated on the front end of the door sill in the region of the wheel well 5 surrounding the wheel 6. According to the invention, a projection module having an array of micro lenses is used for the first time as a surroundings-illuminating device in order to thereby generate a predetermined light distribution in a targeted manner next to the doors 2 and 3 on the motor vehicle.

The projection display, which is described in the published documents DE 10 2009 024 894 A1 and/or DE 10 2011 076 083 A1 already cited above, is used as the projection module. A multi-channel optical system having a two-dimensional arrangement of projection optical systems comprising micro lenses for projection of an image is used in this projection module. In the embodiment described here, the projection module has an LED as the light source. The projection module is very compact and has dimensions in the centimeter range. In one variant, the width, height and length of the projection module are each approximately 15 mm. Each projection optical system of the projection module generates the same individual image, and the overall image is comprised of these individual images superimposed. In the embodiment described here, the overall image is a corresponding light distribution, which is projected onto the ground in the surroundings of the motor vehicle. The direction of propagation of the light shone onto the ground from the projection module 7 is labeled with reference numeral 8.

The light distribution LV projected onto the ground next to the vehicle can be seen in the view from above in FIG. 2 and generates the effect of a carpet of light. It should be pointed out here that the light distribution is shown as being next to the doors 2' and 3' which are at the right next to the vehicle 1, in contrast with those in FIG. 1. This is possible because projection modules 7 are installed symmetrically on the right and left sides in the motor vehicle. In other words, suitably reflected light distributions are generated next to the entry doors on both the right and left sides of the vehicle. For reasons of simplicity, FIG. 2 shows only the light distribution next to the doors 2' and 3'. In the exemplary embodiment in FIG. 2, the light distribution LV is a pattern of parallel stripes running obliquely to the longitudinal axis of the vehicle. These are shown as dark stripes, which represent the actual light distribution of light bars on the ground next to the vehicle. As shown in FIG. 2, the light distribution widens from the front door 2' to the region behind the door 3'. It can also be seen that the striped pattern of the light distribution disappears in the rear region, so that this effect is generated by a decreasing brightness of the stripes.

The striped pattern shown here is merely one example of a generated light distribution, but any other patterns may also be generated. In particular, a dot pattern may also be represented by the light distribution. Furthermore, the stripes of the striped pattern may also run in a different direction, e.g., parallel or perpendicular to the longitudinal axis of the vehicle.

Using the projection module 7 installed in the vehicle, projections of light patterns of any desired sharpness can be generated by the micro lens array with a very small installation space for the projection module at the same time. In the embodiment according to FIG. 2, the light distribution may be utilized as a so-called "welcome element" in which the light projection is generated on the ground in front of the vehicle as the driver and/or a passenger approach the vehicle. If necessary, the light distribution may also be generated only in the region of the rear door 3 and/or 3', for example. In this case, the projection module can be arranged on the forward edge of the rear door. In a chauffeur-driven limousine, the exit of the chauffeured person sitting in the rear may be staged by means of the light distribution, by activating the light distribution when the rear door is opened. In general, through a suitable light pattern in the region of the passenger exits from the vehicle, this achieves the result that the ground next to the vehicle is more visible and thus curbs and/or manhole covers, for example, can be recognized more easily by a person entering or exiting the vehicle, so that safety is increased. In addition, due to the arrangement of the projection module in the door sill 4, this ensures that when the doors are opened, there is no shadowing of the light distribution, i.e., the light distribution is always visible on the ground around the vehicle, regardless of the position of the doors.

Due to the use of a projection module with a micro lens array, which preferably has approximately 200 micro lenses, the corresponding light pattern can be projected sharply onto the ground over the entire length. Each lens projects the structure of the entire light pattern. This has the advantage that, in the case of contamination and/or obstruction of the light-emitting surface of the projection module, the entire light pattern still always remains visible and only its brightness is diminished.

FIG. 3 shows a detailed view of the projection module from FIG. 1 in cross section. The module 7, which is integrated into the door sill 4 near the wheel well 5, includes a light source 701, which is indicated schematically and is embodied as an LED. The multichannel projection optical system in the form of a micro lens array 702 is coupled to the light source. The array is, in turn, merely indicated schematically. According to FIG. 3, the projection module is arranged in a light shaft 9 running obliquely toward the rear, so it is ensured that the light source cannot be observed directly, thereby taking into account statutory requirements.

Figure 4:
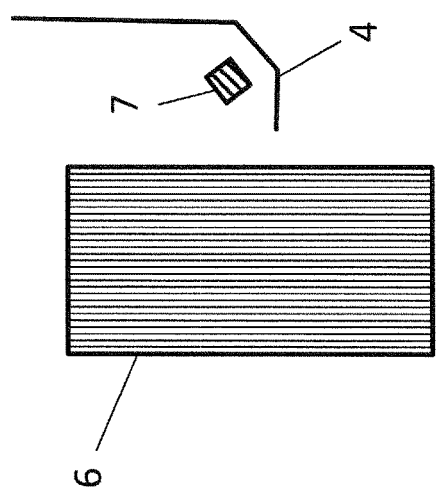
FIG. 4 is a view of the surroundings-illuminating device from FIG. 3, as seen in the longitudinal direction of the motor vehicle.

FIG. 4 shows a view of the projection module from FIG. 3, again in a cross section, as seen in the longitudinal direction of the vehicle from the front to the back. In addition to the module 7, one can see the front wheel 6 of the vehicle as well as the door sill 4 in FIG. 4. The door sill runs at an angle of approximately 45° obliquely to the ground in a partial section. In comparison with this partial section, the projection module 7, which is merely indicated schematically, is situated opposite this partial section, but for reasons of simplicity, the light shaft is not shown. The projection module 7 is held on the door sill via a holding device, wherein the light shaft 9 is part of the holding device. The holding device itself is not shown in detail. The holding device can be removed from the threshold, so that the projection module can be replaced by a new one in the event of a defect. To compensate for manufacturing tolerances, an adjustment is preferably provided, so that the position of the projection module relative to the light shaft can be adjusted manually within certain limits and optionally also automatically by use of corresponding actuators. This makes it possible to achieve the result that the light distribution is always imaged sharply on the ground.

The embodiments of the invention described above have a number of advantages. In particular, by using a projection module with a micro lens array, a readily visible light distribution can be generated in the form of a carpet of light on the ground in the surroundings of a motor vehicle. A wide variety of patterns can be generated, which are visible both when the vehicle doors are open and when they are closed. In this way, various light scenes can be generated in approaching the vehicle and/or in entering or exiting from the vehicle. In addition, the carpet of light also serves as functional lighting, because it ensures better recognizability of the ground relief. The ground relief is especially readily discernible when using a striped pattern. The carpet of light creates only one light emission in the lower field of vision of the vehicle and is reflected to the rear in the direction of travel in the embodiment described here. In doing so, additional effects can be generated, for example, by dimming-up. In particular, light patterns can propagate slowly toward the rear (creeping effect, dynamic staging). Due to the use of a compact projection module, very little installation space is needed and the carpet of light generated remains visible even with contamination and/or a partially obscured light source of the projection module.

LIST OF REFERENCE NUMERALS

1 motor vehicle
2, 2', 3, 3' vehicle doors
4 door sill
5 wheel well
6 wheel
7 projection module
8 light propagation
LV light distribution
701 light source
702 array of projection optical systems
9 light shaft The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A motor vehicle, comprising:
a surroundings-illuminating device that generates a light distribution on a ground in surroundings around the motor vehicle, wherein the surroundings-illuminating device comprises:
one or more projection modules that generate the light distribution, wherein
each projection module comprises at least one light source and one array of projection optical systems, the array of projection optical systems generating at least a portion of the light distribution from light from the at least one light source, each respective projection module is configured so that each projection optical system projects a single image on the ground that covers essentially an entirety of the light distribution, and the light distribution comprises a superpositioning of individual single images of the projection optical systems.

2. The motor vehicle according to claim 1, wherein each projection optical system comprises at least one micro lens having a diameter of 2000 micrometers or less.

3. The motor vehicle according to claim 2, wherein the array comprises between 100 and 400 projection optical systems.

4. The motor vehicle according to claim 1, wherein the at least one light source comprises one or more LEDs and/or laser diodes.

5. The motor vehicle according to claim 1, further comprising:

a light shaft that extends into a body of the motor vehicle, wherein the one or more projection modules are arranged in the light shaft.

6. The motor vehicle according to claim 5, wherein an installation position of the one or more projection modules in the motor vehicle is adjustable.

7. The motor vehicle according to claim 1, wherein the light distribution is a light pattern.

8. The motor vehicle according to claim 7, wherein
the light pattern comprises a striped pattern, and
a density of stripes of the striped pattern decreases in a predetermined direction on the ground with an increase in distance of the striped pattern from an installation position of the one or more projection modules in the motor vehicle.

9. The motor vehicle according to claim 7, wherein
the light pattern comprises a pattern of dots and/or graphic elements, and
a density of the dots and/or graphic elements decreases in a predetermined direction on the ground with an increase in distance of the pattern from an installation position of the one or more projection modules in the motor vehicle.

10. The motor vehicle according to claim 7, wherein
the light pattern comprises a pattern of dots and/or graphic elements, and
a diameter of the dots and/or graphic elements decreases in a predetermined direction on the ground with an increase in distance of the pattern from an installation position of the one or more projection modules in the motor vehicle.

11. The motor vehicle according to claim 7, wherein the light pattern becomes blurred and/or has a decreased brightness at a remote end of the light pattern from an installation position of the one or more projection modules in the motor vehicle.

12. The motor vehicle according to claim 1, wherein
the light distribution widens along a predetermined direction on the ground with an increase of distance of the light distribution from an installation position of the one or more projection modules in the motor vehicle.

13. The motor vehicle according to claim 1, wherein an unlocking of a central lock of the motor vehicle and/or an opening of an access door of the motor vehicle activates the surroundings-illuminating device to generate the light distribution.

14. The motor vehicle according to claim 1, wherein the at least one light source of the one or more projection modules is dimmed-up so as to activate the light distribution.

15. The motor vehicle according to claim 1, wherein the one or more projection modules are mounted in an access door region of the motor vehicle so as to generate the light distribution in an opening region of the access door, the light distribution not being shaded by the access door.

16. The motor vehicle according to claim 1, wherein the one or more projection modules are provided in a door sill of the motor vehicle at an installation position situated in front, in a longitudinal direction of the motor vehicle, of an entry door for people.

17. The motor vehicle according to claim 1, wherein, during operation, the one or more projection modules generate a light distribution that:
extends on one side of the motor vehicle essentially along a forwardly located driver or passenger entry door and a rearwardly located passenger entry door, or
extends beneath and/or in a longitudinal direction of the motor vehicle behind a luggage compartment access door.

18. The motor vehicle according to claim 1, wherein
the light distribution indicates on the ground a detection field of a wireless sensor,
the detection field being an operating field so that an operating action is automatically triggered on the motor vehicle when a body part or object is introduced into the operating field.

19. The motor vehicle according to claim 18, wherein the wireless sensor is configured such that, upon detecting a foot in the detection field, a luggage compartment access door is automatically unlocked or opened.

* * * * *